Nov. 24, 1959  H. G. SCHUTZE ET AL  2,914,452
CONVERSION OF ORGANIC COMPOUNDS BY RADIATION
Filed April 10, 1957
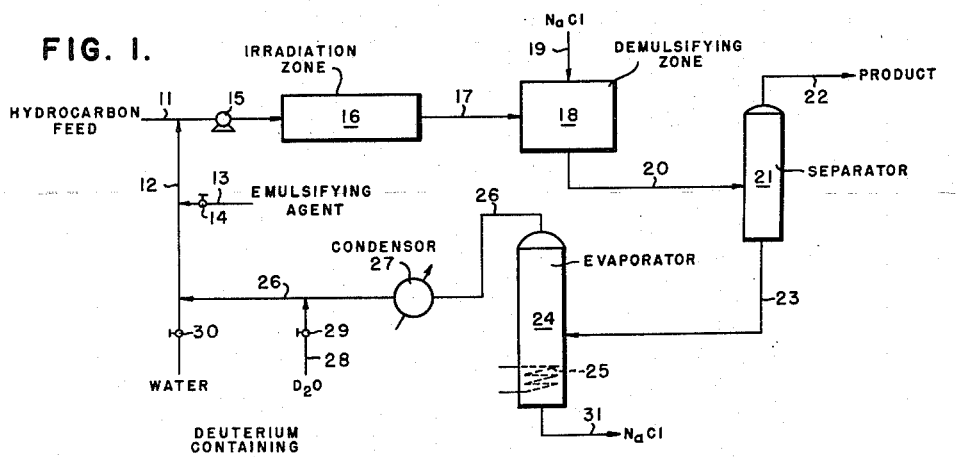
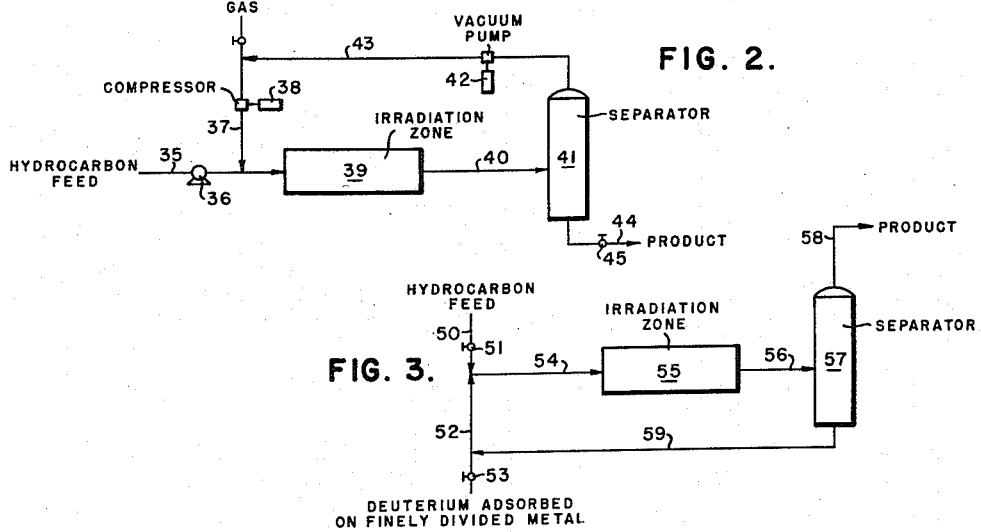
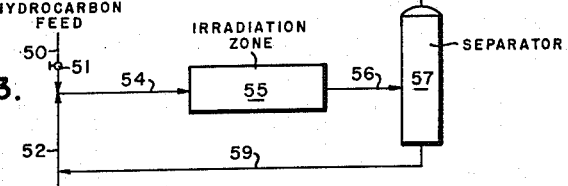
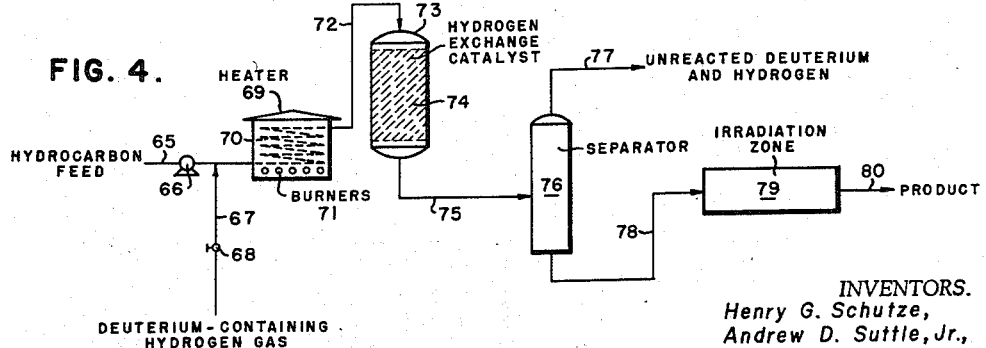
INVENTORS.
Henry G. Schutze,
Andrew D. Suttle, Jr.,
BY
ATTORNEY.

United States Patent Office 2,914,452
Patented Nov. 24, 1959

2,914,452

CONVERSION OF ORGANIC COMPOUNDS BY RADIATION

Henry G. Schutze and Andrew D. Suttle, Jr., Baytown, Tex., assignors, by mesne assignments, to Esso Research and Engineering Company, Elizabeth, N.J., a corporation of Delaware Application April 10, 1957, Serial No. 651,917

13 Claims. (Cl. 204—162)

The present invention is directed to a method of reacting an organic compound by irradiating same. More particularly, the invention is directed to a method of reacting an organic compound in which energetic protons and neutrons are produced directly in organic media. In its more specific aspects, the invention is concerned with irradiating an organic compound such as a hydrocarbon with high ionizing electromagnetic radiation of adequate intensity in the presence of deuterium.

The present invention may be briefly described as a method of reacting an organic compound or material to convert same by irradiating the compound with high intensity electromagnetic radiation in the presence of deuterium in intimate contact with the compound, following which the deuterium is separated from the converted product and the converted product is recovered.

In the practice of the present invention, it is contemplated that the deuterium will be employed in a moderately high concentration, that is, from about 1 to about 10 mole percent of the organic compound or compounds. The deuterium may be intimately contacted with the organic compound by several means, which may include emulsifying heavy water ($D_2O$) with a hydrocarbon or organic compound, saturating the system with the deuterium gas at high pressures, introducing the deuterium into the organic compound or hydrocarbon adsorbed on a finely divided metal, such as zirconium and the like, or deuterating the reactants employing a suitable hydrogen exchange catalyst.

In the practice of the present invention, approximately 0.01% of the gamma flux is converted into heavy particles, protons and neutrons. This may be accomplished by insertion of a reactant loaded with deuterium by any of the several methods listed before between the reflector and biological shield of a nuclear reactor. Employing this procedure will in no way affect the neutron economy of the atomic pile, but will use the strong gamma radiation as a source of energy. This procedure is preferred to direct use of electromagnetic radiation because higher absorption is obtained, as well as the production of more intensely ionizing particles than otherwise. This particular mode permits the chemistry of the reaction to define the temperature.

The temperature may suitably range from about 100° F. to about 3000° F., or even 5000° F., depending on the type of reaction and the type of reactants undergoing the reaction by irradiation. Lower temperatures than 100° F. may be employed in some instances.

The feed stocks of the present invention may suitably include mono-olefins, diolefins, naphthenes, aromatics, paraffins, and mixtures thereof. As examples of the mono-olefins may be mentioned ethylene, propylene, butylenes, pentylenes, hexylenes, heptylenes, octylenes, and the like. Polymers such as polyethylene, polypropylene, polybutene, tripropylene, tetrapropylene, diisobutylene, and other polymers may suitably be used. Thus the feedstocks include hydrocarbons having at least two carbon atoms in the molecule. The feed stocks may suitably include hydrocarbons boiling in the gasoline, kerosene, gas oil, and lubricating oil boiling range. For example, when using hydrocarbons which normally are in the liquid phase, the feed stocks may suitably boil from about 100° to about 850° F. and higher. Crude petroleum and its fractions and residual crude petroleum may form the feed stock of the present invention. Likewise, shale oil and fractions thereof may suitably be employed.

The feed stocks of the present invention may also suitably include oxygenated compounds such as the alcohols, such as aliphatic alcohols including those having from about 1 to 20 carbon atoms, ketones, aldehydes, and the like.

It is to be understood that mixtures of the hydrocarbons given by illustration and mixtures of the oxygen-containing compounds may also be employed as reactants. Oxygenated compounds and hydrocarbons may be reacted in accordance with the present invention.

The reactants may be irradiated in the vapor phase or in the liquid phase. Suitably when deuterium is employed, adsorbed on a finely divided metal such as zirconium, the irradiation may be conducted with the finely divided metal suspended as a slurry in the hydrocarbon. The conversion reactions in accordance with the present invention may include, by way of illustration and not by way of limitation, a reaction such as alkylation, hydrogenation, isomerization, polymerization, aromatization, hydroforming, desulfurization, depolymerization, cross-linking of polymers, and the like.

In conducting the irradiation, the reactants are suitably exposed to an intense field of electromagnetic radiation in which the energy of the radiation exceeds 2.26 m.e.v. and is bombarded with this radiation for a time such that from about $10^5$ to about $10^{10}$ ergs per gram of electromagnetic radiation have been absorbed.

The radiation may suitably be obtained in an atomic pile, from linear accelerators, betatrons, resonant transformers, electrostatic accelerators, fission products, and radioactive nuclides of adequate gamma energy, and the like. It is preferred to employ an atomic pile for the radiation source.

In order to illustrate the invention further, reference will be had to the drawing in which:

Fig. 1 illustrates one mode wherein the hydrocarbon feed is emulsified with $D_2O$;

Fig. 2 illustrates a mode wherein deuterium gas is employed;

Fig. 3 illustrates the employment of deuterium gas adsorbed on a finely divided metal; and Fig. 4 represents a still further mode of conducting the present invention in which a hydrocarbon feed is reacted with deuterium and then irradiated.

Referring now to the drawing, and particularly to Fig. 1, numeral 11 designates a charge line through which a feed hydrocarbon, which may be a mixture of hydrocarbons such as styrene and butadiene, is introduced into the system from a source not shown. Also introduced into line 11 by way of line 12 is a water-containing deuterium oxide. The water has an emulsifying agent added to it by way of line 13 controlled by valve 14. The hydrocarbon feed mixture, the water-deuterium oxide and emulsifying agent are formed into an emulsion in line 11 by passage through a mixing means which may be pump 15 and the emulsion is then introduced into an irradiation zone 16 which suitably may be an atomic pile. On passage of the emulsion through the irradiation zone 16 and exposure to the required amount of gamma radiation, the styrene and butadiene are polymerized to form synthetic rubber. The product, in an emulsion, is then withdrawn from zone 16 by line 17 and discharged thereby into a demulsifying zone 18 into which sodium chloride is introduced by line 19 to break the emulsion. The mixture is then discharged from zone 18 by line 20 into a separator 21, wherein a separation is made between the product, which is withdrawn by line 22, and the aqueous phase containing water-deuterium oxide and sodium chloride. The aqueous phase is withdrawn from separator 21 by line 23 and discharged thereby into an evaporating vessel 24 provided with a heating means illustrated by steam heater coil 25. Substantially all of the water and deuterium oxide are recovered by evaporation from the sodium chloride and the evaporated water and deuterium oxide are discharged from evaporator 24 by line 26 and condensed in condenser 27, and the liquefied water and deuterium oxide are then reintroduced into line 12. Make-up deuterium oxide may be introduced by line 28 controlled by valve 29, while make-up water is introduced by line 30. Sodium chloride is discharged from the evaporator 24 as an aqueous solution by line 31.

It will be seen from the description taken with Fig. 1 that a simple mode has been provided for producing synthetic rubber from olefinic feeds by irradiation in the presence of deuterium.

Referring now to Fig. 2 a hydrocarbon feed such as a gasoline hydrocarbon is introduced into the system by way of line 35 containing a pump 36. Connecting to line 35 is line 37 in which is arranged a compressor 38 by way of which a deuterium-containing gas is introduced into line 35. The deuterium-containing gas may suitably be hydrogen or may be an inert gas such as carbon dioxide and the like. The gasoline hydrocarbons having the deuterium-containing gas admixed therewith under pressure in the range from about 10 to about 1000 pounds per square inch is then introduced into an irradiation zone 39 wherein the gas-containing mixture is irradiated for a sufficient length of time to convert the gasoline hydrocarbons or to purify same. The irradiated product is then discharged from zone 39 by line 40 into a separation zone 41. The product is subjected to a reduced pressure by means of a vacuum pump 42 connecting to zone 41 by line 43, which serves to remove the deuterium-containing gas from the product and to allow recovery of the deuterium-containing gas for return to line 37 by line 43. The product after being freed of deuterium is discharged from zone 41 by line 44 controlled by valve 45.

While the feed stock employed in the mode of Fig. 2 has been illustrated as gasoline, it suitably may be a gas oil or a lubricating oil fraction which is subjected to the irradiation treatment for purifying or for removal of contaminants.

In Fig. 3 a hydrocarbon feed is introduced into the system by line 50 controlled by valve 51 and is admixed with deuterium adsorbed on a finely divided metal introduced by line 52 controlled by valve 53. The resulting slurry of hydrocarbon and finely divided metal containing deuterium is discharged by line 54 into irradiation zone 55 and there irradiated for a sufficient length of time to cause reaction or conversion of the hydrocarbon feed. The product is discharged from zone 55 by line 56 into a separation zone 57, wherein the product is separated from the finely divided metal by gravity, by filtration, centrifugation, and the like, the product being withdrawn by line 58 for use as may be desired. The separated finely divided metal is withdrawn by line 59 and introduced thereby into line 52 for reuse.

It may be desirable to introduce the finely divided metal suspended in a solvent, and to this end a heavier hydrocarbon than the feed employed, or the solvent or suspending means, may be a portion of the hydrocarbon feed.

In Fig. 4 a still further embodiment of the present invention is provided in which a hydrocarbon feed such as a gas oil hydrocarbon is introduced into the system by way of line 65 containing pump 66 and has admixed therewith a deuterium-containing gas such as hydrogen which contains deuterium introduced by way of line 67 controlled by valve 68. The admixture of gas oil, hydrogen and deuterium is then introduced into a heater 69 containing a coil 70 and provided with gas burners 71 in which the gas oil hydrocarbons are vaporized and the mixture heated to a temperature in the range from about 500° to about 800° F. The heated mixture then discharges from heater 69 by line 72 and is introduced thereby into a reaction zone 73 containing a bed of a hydrogen exchange catalyst 74. This hydrogen exchange catalyst 74 may suitably be cobalt molybdate, on an aluminum oxide such as gamma alumina. In zone 73 the hydrogen and the deuterium are reacted with the gas oil hydrocarbons to place deuterium in the hydrocarbon molecule. The product containing deuterium reacted with the hydrocarbon issues from zone 73 by line 75 and is discharged thereby into separator vessel 76, from whence the unreacted deuterium and hydrogen is separated and removed by line 77 and the reacted product containing deuterium in the molecules thereof is discharged by line 78 into an irradiation zone 79 wherein it is exposed to a high intensity electromagnetic radiation as has been illustrated. The irradiated product is withdrawn by line 80 and suitably used as a fuel or as may be desired.

It will be seen from the several modes of practicing the present invention that there are many ways of exposing organic reactants to radiation in the presence of deuterium.

The invention will be further illustrated by the following operations. In the first operation styrene and butadiene are polymerized to form a synthetic rubber. This polymerization is effected by emulsifying one mole of styrene and one mole of butadiene with 5 to 10 moles of water, the emulsion being stabilized by the addition of 0.01 to 0.1 mole percent of a soap. In this operation about one-fifth of the water is $D_2O$, or the equivalent amount of HDO. The emulsion is then exposed to an intense field of electromagnetic radiation in which the energy of much of the radiation exceeds 2.26 m.e.v. and is bombarded until at least $10^6$ to about $10^{10}$ ergs per gram have been absorbed. This reaction may proceed under either static or dynamic conditions. After the exposure to the desired intensity of radiation to absorb the required amount of radiation to complete polymerization, the reactants are recovered by breaking the emulsion by addition of sodium chloride, the heavy water being recovered by evaporation and recycled for reuse.

In another operation in the preparation of cross-linked polyethylene, the polyethylene either in a melted, softened, or finely powdered condition is saturated with deuterium gas at high pressure, said pressure being in the range from about 10 to about 10,000 pounds per square inch, and then subjected to an intense field to provide from about $10^5$ to about $10^{10}$ ergs per gram of electromagnetic radiation having energy in excess of 2.26 m.e.v. In this particular example, the recoil particles from the deuterium disintegration dislodge hydrogen atoms in the polymer and cause an effective cross-linking. The neutrons produced in this reaction are subsequently moderated and absorbed by protons. The resulting deuterium recoils with sufficient energy to break an additional bond. In this operation the deuterium is regenerated, and at the conclusion of the radiation, the unused deuterium gas is recovered by imposing a high vacuum on the irradiated product.

While we have given examples of suitable sources of the desired electromagnetic radiation, other sources may be used, such as radioactive materials as illustrated by $Na^{24}$, $Mn^{56}$, $Ga^{72}$, and $La^{140}$, or high potential accelerators impinging a beam of electrons on a target of high atomic number such as gold, lead, thorium or uranium.

The finely divided metal which may be used to adsorb the deuterium gas is preferably zirconium, but other finely divided metals such as, for example Pd, Pt, and even Ni, may be employed.

Furthermore, while in Fig. 2 an illustration has been given of employing a liquid hydrocarbon in this mode of operation, it may be desirable to employ a solid hydrocarbon such as a polymer and blow the hydrocarbon in admixture with the deuterium gas through the irradiation zone. The mode of Fig. 2 is particularly suitable for an operation where it is desirable to irradiate a solid polymer and the like.

The present invention is of particular usability and advantage, in that improved modes are provided for irradiating organic materials to convert same to desirable products. In the several hydrocarbon reactions illustrated, the hydrocarbons are converted to high octane number material in improved yields. Where gas oils and lubricating oils are employed, fractions are purified having contaminants such as sulfur compounds, color forming bodies, and the like which are removed and which enhance the quality of the hydrocarbons for use as lubricants and as fuels.

The nature and objects of the present invention having been completely described and illustrated, what we wish to claim as new and useful and secure by Letters Patent is:

1. A method of reacting an organic compound selected from the group consisting of the mono-olefins, diolefins, naphthenes, aromatics, paraffins and mixtures thereof having at least two carbon atoms in the molecule and oxygenated compounds having from 1 to 20 carbon atoms in the molecule which comprises irradiating said compound at a temperature in the range from about 100° to about 5000° F. with high intensity gamma radiation in the presence of deuterium in an amount in the range from about 1 to about 10 mole percent of the organic compound in intimate contact with said organic compound in which the energy of radiation exceeds 2.26 m.e.v. for a sufficient length of time to absorb from about $10^5$ to about $10^{10}$ ergs per gram of the organic compound whereby the organic compound is reacted and the deuterium is regenerated and then separately recovering the regenerated deuterium and the reacted organic compound.

2. A method in accordance with claim 1 in which the organic compound is a hydrocarbon.

3. A method in accordance with claim 1 in which the organic compound is a polymerized hydrocarbon.

4. A method in accordance with claim 1 in which the deuterium is in intimate contact with said organic compound as an emulsion containing deuterium oxide.

5. A method in accordance with claim 1 in which the deuterium is in intimate contact with said organic compound as a deuterium-containing gas.

6. A method in accordance with claim 1 in which the deuterium is in intimate contact with the organic compound by reacting therewith.

7. A method in accordance with claim 1 in which the organic compound is an oxygenated compound.

8. A method in accordance with claim 7 in which the oxygenated compound is an aliphatic alcohol having from about 1 to 20 carbon atoms.

9. A method in accordance with claim 7 in which the oxygenated compound is a ketone.

10. A method in accordance with claim 7 in which the oxygenated compound is an aldehyde.

11. A method in accordance with claim 1 in which the deuterium is adsorbed on a finely divided metal suspended in the organic compound.

12. A method in accordance with claim 1 in which the organic compound comprises a mixture of styrene and butadiene.

13. A method in accordance with claim 1 in which the regenerated deuterium is recycled to contact additional quantities of said organic compound.

References Cited in the file of this patent

"Modern Plastics," vol. 32 (1954), pages 146, 148, 232 and 233.

Collinson et al.: "Discussions of the Faraday Society," vol. 12 (1952), pages 212 to 216.

Modern Plastics, vol 32 (September 1954), page 150.